US008819343B2

(12) United States Patent
Benhase et al.

(10) Patent No.: US 8,819,343 B2
(45) Date of Patent: *Aug. 26, 2014

(54) PERIODIC DESTAGES FROM INSIDE AND OUTSIDE DIAMETERS OF DISKS TO IMPROVE READ RESPONSE TIMES

(71) Applicant: International Business Machines Corporation, Armonk, NY (US)

(72) Inventors: Michael T. Benhase, Tucson, AZ (US); Lokesh M. Gupta, Tucson, AZ (US); Christopher J. Strauss, Trabuco Canyon, CA (US); Will A. Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/842,057

(22) Filed: Mar. 15, 2013

(65) Prior Publication Data

US 2013/0235709 A1 Sep. 12, 2013

Related U.S. Application Data

(63) Continuation of application No. 13/299,054, filed on Nov. 17, 2011.

(51) Int. Cl.
*G06F 12/00* (2006.01)
(52) U.S. Cl.
USPC ............................ 711/135; 711/142; 711/143
(58) Field of Classification Search
USPC .......................................... 711/135, 142, 143
See application file for complete search history.

(56) References Cited

U.S. PATENT DOCUMENTS

| 5,084,791 | A | | 1/1992 | Thanos et al. |
| 5,542,066 | A | | 7/1996 | Mattson et al. |
| 5,636,355 | A | * | 6/1997 | Ramakrishnan et al. ..... 711/113 |
| 5,715,424 | A | | 2/1998 | Jesionowski et al. |
| 6,304,946 | B1 | | 10/2001 | Mason, Jr. |
| 7,191,207 | B2 | | 3/2007 | Blount et al. |
| 7,539,815 | B2 | | 5/2009 | Zohar et al. |
| 7,574,556 | B2 | | 8/2009 | Gill et al. |
| 7,603,530 | B1 | | 10/2009 | Liikanen et al. |
| 2006/0253621 | A1 | | 11/2006 | Brewer et al. |
| 2006/0282542 | A1 | * | 12/2006 | Pinckney et al. ............. 709/231 |

(Continued)

OTHER PUBLICATIONS

PCT International Search Report and Written Opinion dated Mar. 7, 2013 for Application No. PCT/IB2012/056160 filed Nov. 5, 2012.

(Continued)

*Primary Examiner* — Gurtej Bansal
(74) *Attorney, Agent, or Firm* — Rabindranath Dutta; Konrad Raynes Davda & Victor LLP

(57) ABSTRACT

A storage controller that includes a cache, receives a command from a host, wherein a set of criteria corresponding to read response times for executing the command have to be satisfied. A destage application that destages tracks based at least on recency of usage and spatial location of the tracks is executed, wherein a spatial ordering of the tracks is maintained in a data structure, and the destage application traverses the spatial ordering of the tracks. Tracks are destaged from at least inside or outside diameters of disks at periodic intervals, while traversing the spatial ordering of the tracks, wherein the set of criteria corresponding to the read response times for executing the command are satisfied.

7 Claims, 5 Drawing Sheets

(56) References Cited

U.S. PATENT DOCUMENTS

| | | |
|---|---|---|
| 2007/0220200 A1 | 9/2007 | Gill et al. |
| 2008/0168220 A1 | 7/2008 | Gill et al. |
| 2008/0168234 A1* | 7/2008 | Gill et al. ............... 711/134 |
| 2008/0189489 A1 | 8/2008 | Mitra |
| 2008/0201523 A1 | 8/2008 | Ash et al. |
| 2009/0222621 A1 | 9/2009 | Ash et al. |
| 2009/0293036 A1* | 11/2009 | Yau ............................. 716/18 |
| 2009/0293063 A1 | 11/2009 | Fairhurst et al. |
| 2010/0174867 A1 | 7/2010 | Gill et al. |
| 2011/0078303 A1* | 3/2011 | Li et al. ........................ 709/224 |
| 2011/0191534 A1 | 8/2011 | Ash et al. |

OTHER PUBLICATIONS

Office Action dated May 14, 2013, pp. 1-42, for U.S. Appl. No. 13/299,054, filed Mar. 15, 2013, by inventors M.T. Benhase, et al. (18.436).

Response dated Aug. 14, 2013, pp. 13, to Office Action dated May 14, 2013, pp. 1-42, for U.S. Appl. No. 13/299,054, filed Mar. 15, 2013, by inventors M.T. Benhase, et al. (18.436).

U.S. Appl. No. 13/299,048, entitled "Adjustment of Destage Rate Based on Read and Write Response Time Requirements", filed Nov. 17, 2011, Invented by M.T. Benhase et al., 34 pp. [18.435].

U.S. Appl. No. 13/790,460, entitled "Adjustment of Destage Rate Based on Read and Write Response Time Requirements", filed Mar. 8, 2013, invented by M.T. Benhase et al., 29 pp. [18.435C1].

U.S. Appl. No. 13/299,054, entitled "Periodic Destages From Inside and Outside Diameters of Disks to Improve Read Response Times", filed Nov. 17, 2011, invented by M.T. Benhase et al., 29 pp. [18.436].

Preliminary Amendment for U.S. Appl. No. 13/299,054, dated Mar. 15, 2013, 7 pp. [18.436 (PrelimAmend)].

Notice Allowance dated Feb. 19, 2014, pp. 9, for U.S. Appl. No. 13/299,054, filed Mar. 15, 2013 (18.436).

Office Action dated Oct. 29, 2013, pp. 14, for U.S. Appl. No. 13/299,054, filed Mar. 15, 2013, (18.436).

Response dated Jan. 29, 2014, pp. 10, to Office Action dated Oct. 29, 2013, pp. 14, for U.S. Appl. No. 13/299,054, filed Mar. 15, 2013, (18.436).

RCE Amendment dated Apr. 10, 2014, pp. 8, for U.S. Appl. No. 13/299,054, filed Mar. 15, 2013.

Notice Allowance dated Apr. 22, 2014, pp. 13, for U.S. Appl. No. 13/299,054, filed Mar. 15, 2013.

* cited by examiner

PERIODIC DESTAGES FROM INSIDE AND OUTSIDE DIAMETERS OF DISKS TO IMPROVE READ RESPONSE TIMES

CROSS-REFERENCE TO RELATED APPLICATIONS

This application is a continuation of application Ser. No. 13/299,054 filed on Nov. 17, 2011, which is incorporated herein by reference in its entirety.

BACKGROUND

1. Field

The disclosure relates to a method, system, and article of manufacture for periodic destages from insides and outside diameters of disks to improve read response times.

2. Background

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively smaller in comparison to the storage capacity of certain other storage devices, such as, hard disks, etc., that are controlled by the storage controller. The cache may be comprised of one or more of random access memory (RAM), non-volatile storage device (NVS), read cache, write cache, etc., that may interoperate with each other in different ways. The NVS may be comprised of a battery backed-up random access memory and may allow write operations to be performed at a high speed. The storage controller may manage Input/Output (I/O) requests from networked hosts to the plurality of storage devices.

Caching techniques implemented by the storage controller assist in hiding I/O latency. The cache may comprise a high speed memory or storage device used to reduce the effective time required to read data from or write data to a lower speed memory or device. The cache memory is used for rapid access to data staged from external storage to service read data access requests, and to provide buffering of modified data. Write requests are written to the cache and then written (i.e., destaged) to the external storage devices.

NVS was introduced for allowing fast writes. Generally, in the absence of NVS, data writes may have to be synchronously written (i.e., destaged) directly to the storage device to ensure consistency, correctness, and persistence. Otherwise failure of the server may cause data stored in the cache to be lost. Generally the rate of host writes exceeds the speed of the storage devices, hence without NVS the rate of data transfer to storage devices may be slow. NVS enables fast writes to cache where the writes are mirrored to and stored safely in the NVS until the writes can be transferred to the external storage device. The data is destaged from cache later (and discarded from NVS) in an asynchronous fashion thus hiding the write latency of the storage device. The cache and NVS typically store updates intended for multiple storage devices. To guarantee continued low latency for writes, the data in the NVS may have to be drained so as to ensure that there is always some empty space for incoming writes; otherwise, follow-on writes may become effectively synchronous, which may adversely impact the response time for host writes. On the other hand, if the writes are drained too aggressively, then the benefits of write caching may not be fully exploited since the average amount of NVS cache utilized may be low.

Staging to the cache from secondary storage and destaging from the cache to secondary storage may be performed via a variety of cache management mechanisms. For example temporal mechanisms, such as least recently used (LRU) based mechanisms may destage tracks based on which tracks are least recently used (LRU) Spatial ordering of tracks may be performed by certain cache management mechanisms, where reads and writes are stored in increasing or decreasing order of logical addresses in an ordered list and the ordered list traversed for destages. Such spatial destaging may favor destaging segments of data located closest together on the disks.

SUMMARY OF THE PREFERRED EMBODIMENTS

Provided are a method, a system, and a computer program product in which a storage controller that includes a cache, receives a command from a host, wherein a set of criteria corresponding to read response times for executing the command have to be satisfied. A destage application that destages tracks based at least on recency of usage and spatial location of the tracks is executed, wherein a spatial ordering of the tracks is maintained in a data structure, and the destage application traverses the spatial ordering of the tracks. Tracks are destaged from at least inside or outside diameters of disks at periodic intervals, while traversing the spatial ordering of the tracks, wherein the set of criteria corresponding to the read response times for executing the command are satisfied.

In further embodiments, by destaging tracks from the inside and outside diameters of disks at the periodic intervals, read tracks that are relatively distant from a current location of a head are serviced by overriding the spatial ordering.

In still further embodiments, the set of criteria specifies that the average read response time is to be less than a first threshold, and that a predetermined percentage of reads are to be performed in a time less than a second threshold.

In additional embodiments, a timer is set to a predetermined time interval and a destage counter is set to zero. A track at a cursor position is picked up for destage while traversing a sorted binary tree of tracks that comprises the data structure. In response to determining that the timer has expired, and in response to determining that the destage counter is zero, the first track at the beginning of the sorted binary tree is found and destaged instead of a track at the cursor position, without changing the cursor position. The destage counter is incremented to one and the destage application continues to pick up tracks to perform destages from the cursor.

In still additional embodiments, in response to determining that the timer has expired, and in response to determining that the destage counter is not zero, the last track at the end of the sorted binary tree is found and destaged instead of a track at the cursor position, without changing the cursor position. The destage counter to set to zero and the timer is set to the predetermined time interval. The destage application continues to pick up tracks to perform destages from the cursor position.

In certain embodiments, the periodic interval is a fixed predetermined period of time, where the fixed predetermined period of time is determined by simulating a workload that corresponds to at least read requests at the storage controller from a stringent read requirements application.

BRIEF DESCRIPTION OF THE DRAWINGS

Referring now to the drawings in which like reference numbers represent corresponding parts throughout.

DETAILED DESCRIPTION

Figure 1:
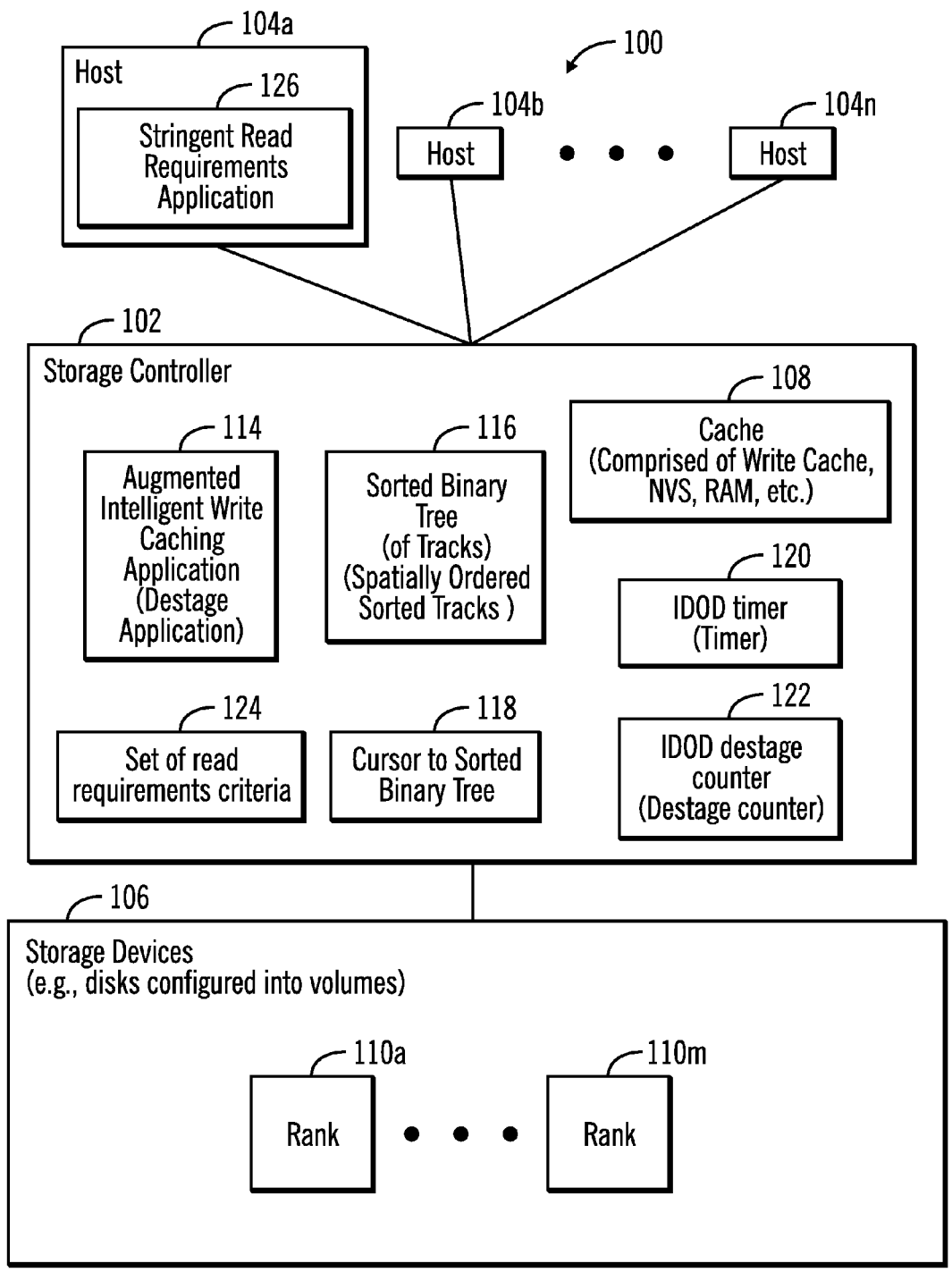
FIG. 1 illustrates a block diagram of a computing environment that includes a storage controller coupled to a plurality of hosts and a plurality of storage devices, in accordance with certain embodiments.

In the following description, reference is made to the accompanying drawings which form a part hereof and which illustrate several embodiments. It is understood that other embodiments may be utilized and structural and operational changes may be made.

Spatial Locality Based Destaging and Read Response Time Requirements

Intelligent cache writing (IWC) is a hybrid of two other cache management mechanisms referred to as CLOCK and CSCAN. CLOCK is a least recently used (LRU) based mechanism which destages tracks based on which tracks are LRU or least recently used. To emulate CLOCK properties, IWC maintains a temporal bit per track. The temporal bit gets set when the host writes a track. Temporal bit gets reset when a destage scan comes across a track with the temporal bit set. If the destage scan finds strides with no tracks having a temporal bit set, the destage scan can choose that stride for destage. CSCAN demotes tracks based on spatial location. To emulate CSCAN properties, IWC maintains a sorted list of tracks using a balanced tree. Destage scans looking for tracks to destage may traverse the balanced tree in the order of track location from lowest to highest.

Some applications, such as mission critical applications, real-time applications, or certain applications in the medical field may have strict requirements on read response times. Such applications may be referred to as stringent read requirements applications. For example, in certain applications, the average read response time has to be less than 15 milliseconds, 99.99% of the reads have to be completed in less than 600 milliseconds, 99.9% of reads have to be completed in less than 200 milliseconds, and 99% of reads have to be completed in less than 60 milliseconds. For example, out of every 10000 reads, each of at least 9900 reads have to be completed in less than 60 milliseconds, each of at least 9990 reads have to be completed in less than 200 milliseconds, and each of at least 9999 reads have to be completed in less than 600 milliseconds, where the average time of each read should be less than 15 milliseconds. In other words, no more than one read out of 10000 reads can take 600 milliseconds or more time, no more than 10 reads out of 10000 can take 200 milliseconds or more time, and no more than 100 reads out of 10000 can take 60 milliseconds or more time.

In certain situations, by using IWC, destages are performed in a spatial order, and read performance can suffer. When IWC is destaging in sorted order of the data location, there may be reads on the devices that are spread all over the devices. Disk drives can ignore the reads in order to avoid a long seek for servicing reads that are far from the head. There may be a CAL (command aging limit) timer with an exemplary default value of 500 milliseconds. When the CAL timer expires, the disk drives are forced to service the read requests outstanding for a duration greater than the default value of the CAL timer. Stringent read requirements application may find that read service times of 500 milliseconds to be too high for them.

In certain embodiments, an augmented IWC cache management mechanism is applied. In the augmented IWC cache management mechanism, destages are performed by traversing a sorted spatially ordered list of tracks. However, while performing destages from the sorted spatially ordered list of tracks, every so often the augmented IWC cache management mechanism performs one destage at ID (inside diameter) and/or one destage at OD (outside diameter) of disk drives. This forces the disk drives to service commands that are far apart from the current location of the head. As a result reads that are far apart from the destage location can be serviced on as to satisfy the read requirements of the stringent read requirements application.

EXEMPLARY EMBODIMENTS

FIG. 1 illustrates a block diagram of a computing environment 100 that includes a storage controller 102 coupled to a plurality of hosts 104*a*, 104*b*, . . . 104*n*, and a plurality of storage devices 106, in accordance with certain embodiments. The plurality of storage devices 106 may be referred to as secondary storage devices, in contrast to a cache 108 that is included in the storage controller 102.

The storage controller 102 and the hosts 104*a* . . . 104*n* may comprise any suitable computational device including those presently known in the art, such as, a personal computer, a workstation, a server, a mainframe, a hand held computer, a palm top computer, a telephony device, a network appliance, a blade computer, a server, etc. The storage controller 102, the hosts 104*a* . . . 104*n*, and the plurality of storage devices 106 may communicate over a network, such as the Internet, a storage area network, a wide area network, a local area network, etc.

The plurality of storage devices 106 may comprise any suitable storage devices, such as physical hard disks, solid stage disks, etc., known in the art. The storage devices 106 may be configured into volumes. In certain embodiments, storage devices 106 may be disks that are configured as Redundant Array of Independent Disk (RAID) ranks. In FIG. 1, a plurality of RAID ranks 110*a* . . . 110*m* are shown.

The cache 108 may comprise one or more of different types of memory, such as RAMs, write caches, read caches, NVS, etc. The different types of memory that comprise the cache may intemperate with each other. Writes from the hosts 104*a* . . . 104*n* may initially be written to the cache 108 and then later destaged to the storage devices 106. Read requests from the hosts 104*a* . . . 104*n* may be satisfied from the cache 108 if the corresponding information is available in the cache 108, otherwise the information is staged from the storage devices 106 to the cache 108 and then provided to the hosts 104*a* . . . 104*n*.

The storage controller 102 executes a destage application 114 that is also referred to as an augmented intelligent write caching application. The augmented intelligent write caching application 114 maintains a sorted binary tree of tracks 116 that are arranged in a spatial order of occurrence of the tracks on disks. The augmented intelligent write caching application 114 also maintains a cursor 118 to the sorted binary tree 116, where the cursor 118 shows the position of the track to be destaged while traversing the sorted binary tree 116.

The destage application 114 further maintains an inside diameter (ID) outside diameter (OD) timer 120 that is also referred to as a timer or an IDOD timer. The timer 120 may initially be set to a predetermined duration of time, such as 10 milliseconds. The destage application 114 also maintains a counter 122 referred to as a destage counter or an IDOD destage counter.

In certain embodiments, the augmented intelligent write caching application 114 traverses the sorted binary tree 116 of tracks to perform destages such that a set of read requirements criteria 124 for certain exemplary applications (e.g., stringent read requirements application 126 shown in the exemplary host 104a) are satisfied.

In certain embodiments, the stringent read requirements application 126 with read response time requirements 124 may send a command from the host 104a to the storage controller 102. The command may comprise a read or a write request or some other command. The augmented intelligent write caching application 114 processes the command to at least satisfy the criteria indicated by the set of read requirements criteria 124, by traversing the sorted binary tree 116 of tracks.

Figure 2:
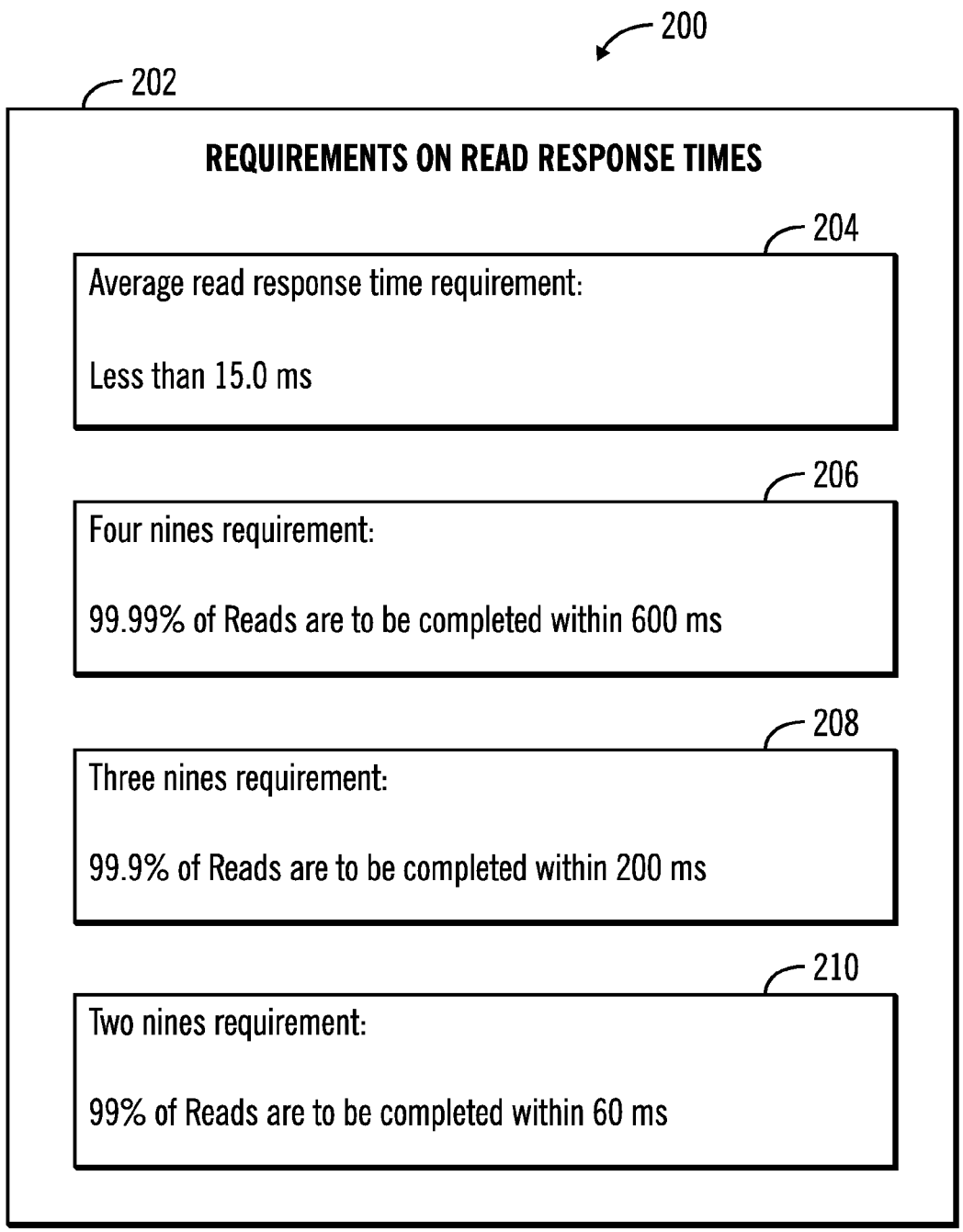
FIG. 2 illustrates a block diagram that shows exemplary requirements on read response times, in accordance with certain embodiments.

FIG. 2 illustrates a block diagram 200 that shows exemplary requirements on read response times 202 for exemplary stringent read requirements applications 126, in accordance with certain embodiments.

In certain embodiments the exemplary requirements of read response times may be as follows:
1) The average read response time is to be less than 15.0 milliseconds (shown via reference numeral 204);
2) Four nines requirement: 99.99% of reads are to be completed in a time that within 600 milliseconds (shown via reference numeral 206);
3) Three nines requirement: 99.9% of reads are to be completed in a time that is within 200 milliseconds (shown via reference numeral 208); and
4) Two nines requirements: 99% of reads are to be completed in a time that is within 60 milliseconds (shown via reference numeral 210).

In certain embodiments, if the wait time for a read is more than 500 milliseconds, the read is performed even if there are any pending writes. The 500 milliseconds time is the command aging limit (CAL) time. In such embodiments, the four nines requirement may be easy to satisfy, but the three nines requirements and the two nines requirements may be difficult to satisfy unless pending reads that are distant from the location of the head of a disk drive are provided some additional preference over pending destages (i.e., writes to disk from cache), while destaging tracks indicated in the sorted binary tree 116.

Figure 3:
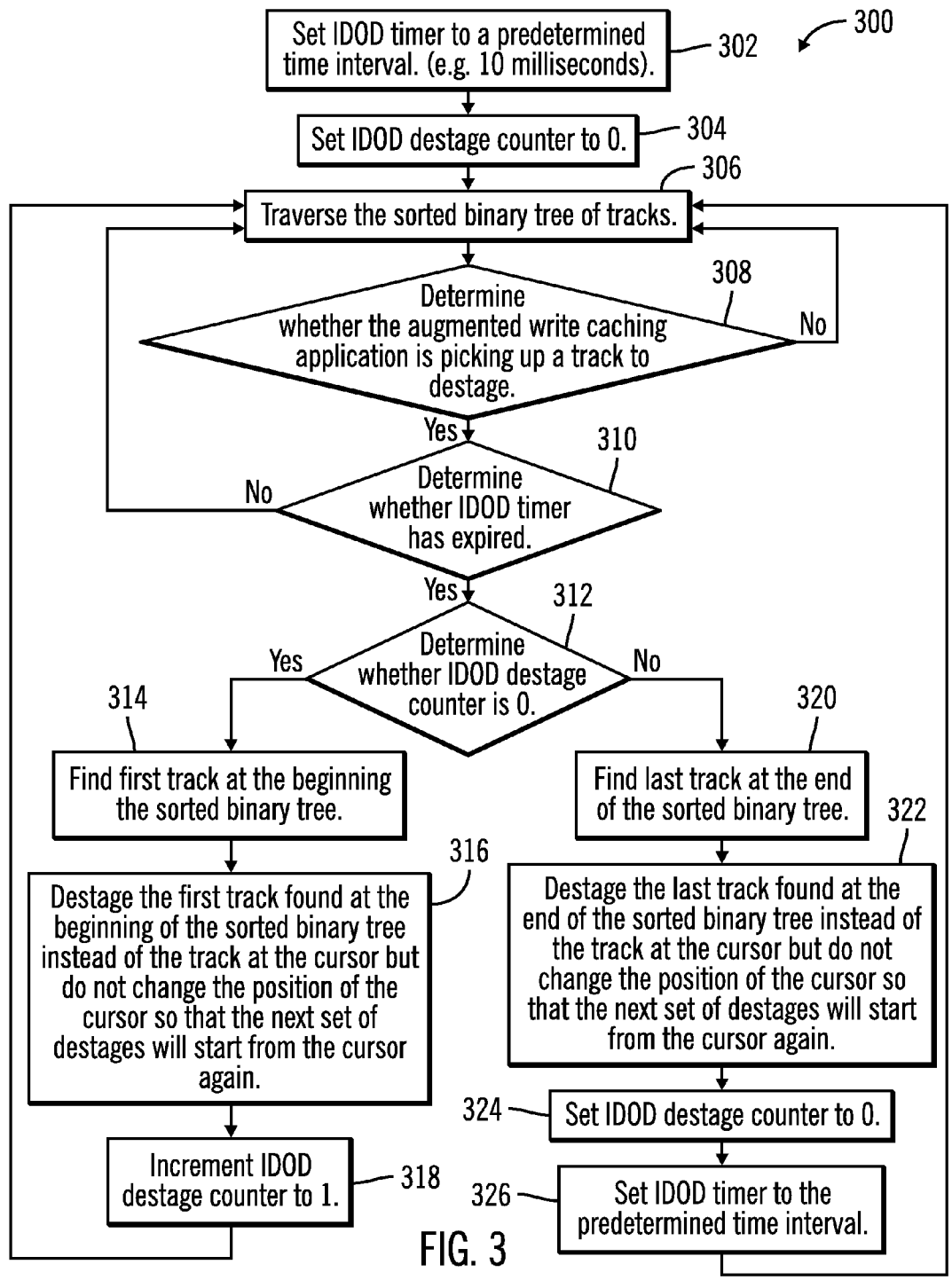
FIG. 3 illustrates a flowchart that shows first operations for performing periodic de-stages from inside and outside diameters of disks while traversing a data structure that stores tracks in a sorted spatial order, in accordance with certain embodiments.

FIG. 3 illustrates a flowchart 300 that shows first operations for performing periodic destages from inside and outside diameters of disks while traversing a data structure 116 that stores tracks in a sorted spatial order, in accordance with certain embodiments. The operations shown in FIG. 3 may be performed by the augmented intelligent write caching application 114 implemented in the storage controller 102.

Control starts at block 302 in which a timer 120 (e.g., the IDOD timer) is set to a predetermined time interval (e.g., 10 milliseconds), and then control proceeds to block 304 in which a destage counter 122 (e.g., the IDOD destage counter) is set to zero.

Control proceeds to block 306 in which the augmented intelligent write caching application 114 starts traversing (i.e., scanning) the sorted binary tree 116 of tracks. The augmented intelligent write caching application 114 determines (at block 308) whether a track at a cursor position has been picked up for destage while traversing the sorted binary tree 116. If so, a determination is made (at block 310) as to whether the timer 120 has expired (i.e., the predetermined time interval has been exceeded). If the timer 120 has expired, then a determination is made (at block 312) as to whether the destage counter 122 is zero.

If at block 312 a determination is made that the destage counter 122 is zero ("Yes" branch from block 312), the first track at the beginning of the sorted binary tree is found (at block 314) and destaged (at block 316) instead of a track at the cursor position, without changing the cursor position. As a result the next set of destages will start from the cursor position once again. The destage counter 122 is incremented (at block 318) to one. Control returns to block 306 and the augmented intelligent write caching application 114 continues to pick up tracks to perform destages from the cursor.

If at block 312 a determination is made that the destage counter 122 is not zero ("No" branch from block 312) then the last track at the end of the sorted binary tree is found (at block 320) and destaged (at block 322) instead of a track at the cursor position, without changing the cursor position. As a result the next set of destages will start from the cursor position once again. The destage counter 122 is set (at block 324) to zero and the timer 120 is set (at block 326) to the predetermined time interval. Control returns to block 306 and the augmented intelligent write caching application 114 continues to pick up tracks to perform destages from the cursor. Control also returns to block 306 from blocks 308 and 310 when the "No" branches are followed.

Figure 4:
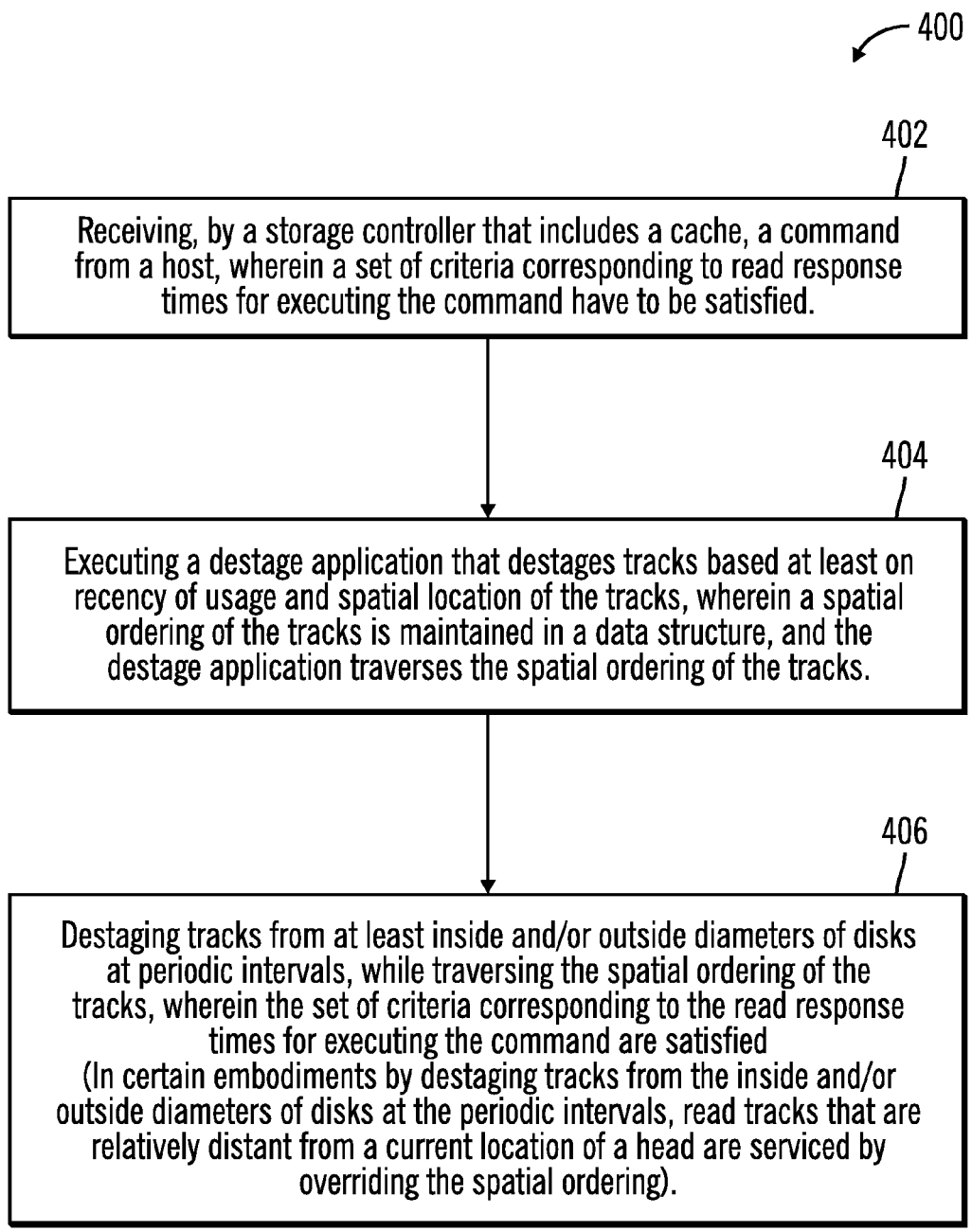
FIG. 4 illustrates a flowchart that shows second operations for performing periodic destages from inside and/or outside diameters of disks while traversing a data structure that stores tracks in a sorted spatial order, in accordance with certain embodiments.

Therefore, FIG. 4 illustrates certain embodiments in which by using a timer 120 and a destage counter 122, the augmented intelligent write caching application 114 improves the response time to reads, by periodically moving the head for destaging from the inside and/or outside diameter of disks while traversing a sorted binary tree 116 of spatially ordered tracks. The increase is read response time is at least adequate to satisfy the set of read requirements criteria 124. If the read response time is not adequate to satisfy the set of read requirements criteria 124, then the timer 120 may be set to a lower predetermined value and the destages from the inside and outside diameters may be performed at smaller time intervals. In certain embodiments, workload simulations may be performed to determine what predetermined value of the timer 120 is adequate to satisfy the read response times provided by the read requirements criteria 124.

It should be noted, that in certain embodiments the first track at the beginning of the sorted binary tree may correspond to a track at the inside diameter of a disk or some track that is close to the inside diameter of the disk, and the last track at the end of the sorted binary tree may correspond to aback at the outside diameter of the disk or some track that is close to the outside diameter of the disk. In alternative embodiments, the first track at the beginning of the sorted binary tree may correspond to a track at the outside diameter of a disk or some track that is close to the outside diameter of the disk, and the last track at the end of the sorted binary tree may correspond to a track at the inside diameter of the disk or some track that is close to the inside diameter of the disk. In the sorted binary tree the tracks present within the inside and the outside diameters of the disk are ordered spatially. In alternative embodiments, other data structures besides the sorted binary tree may represent the ordering of tracks.

FIG. 4 illustrates a flowchart 400 that shows second operations for performing periodic destages from inside and/or outside diameters of disks while traversing a data structure that stores tracks in a sorted spatial order, in accordance with certain embodiments. The operations shown in FIG. 4 may be performed by the augmented intelligent write caching application 114 implemented in the storage controller 102.

Control starts at block 402 in which a storage controller 102 that includes a cache 108, receives a command from a host 104a, wherein a set of criteria 124 corresponding to read response times for executing the command have to be satisfied, A destage application 114 that destages tracks based at least on recency of usage and spatial location of the tracks is executed (at block 404), wherein a spatial ordering of the tracks is maintained in a data structure 116, and the destage application 114 traverses the spatial ordering of the tracks. In certain embodiments, the destage application 114 is an augmented intelligent write caching application.

Control proceeds to block 406 in which tracks are destaged from at least inside and/or outside diameters of disks at periodic intervals, while traversing the spatial ordering of the tracks, wherein the set of criteria 124 corresponding to the read response times for executing the command are satisfied. In certain embodiments, by destaging tracks from the inside and/or outside diameters of disks at the periodic intervals, read tracks that are relatively distant from a current location of a head are serviced by overriding the spatial ordering.

Therefore, FIGS. 1-4 illustrate certain embodiments in which an augmented intelligent write caching application 114 augments an intelligent write caching application that is a hybrid of CLOCK and CSCAN destage mechanism. The augmented intelligent write caching application periodically destages tracks from inside and/or outside diameters of disks while traversing a spatially sorted list of tracks for destages, by overriding the current track to be destaged from the spatially sorted list. As a result reads can be performed with a faster response time in comparison to situations where periodic destages at predetermined time intervals are not performed from inside and/or outside diameter of disks.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
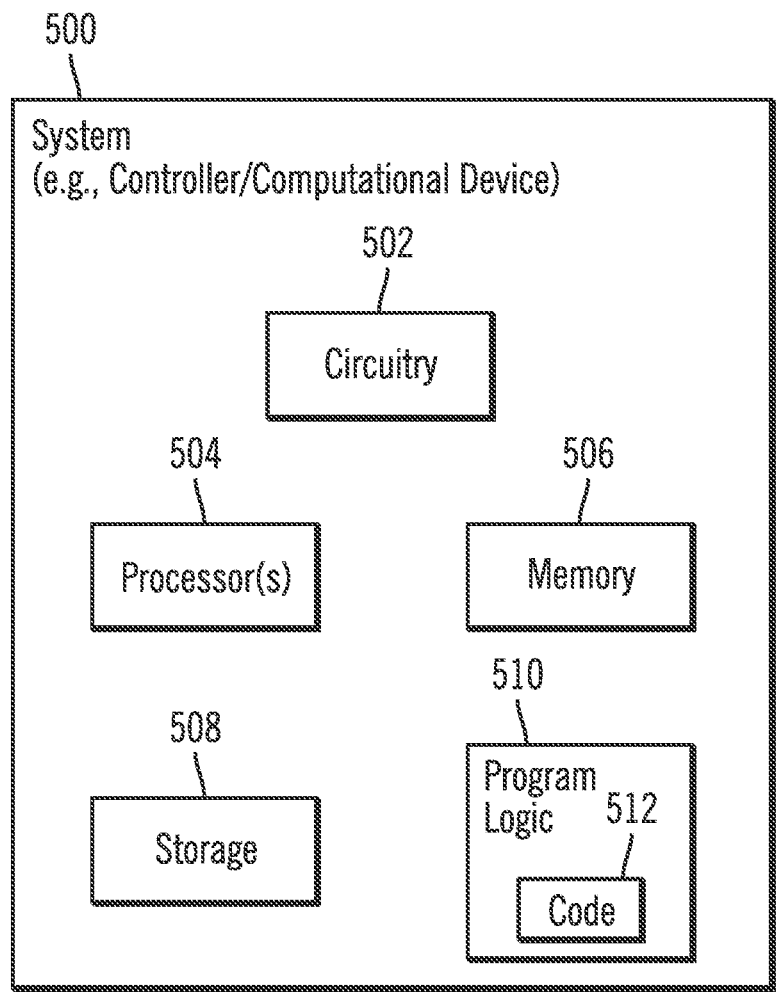
FIG. 5 illustrates a block diagram of a computational system that shows certain elements that may be included in the storage controller of FIG. 1, in accordance with certain embodiments.

FIG. 5 illustrates a block diagram that shows certain elements that may be included in the storage controller 102 or the hosts 104a...104n, in accordance with certain embodiments. The system 500 may comprise the storage controller 102 or the hosts 104a...104n, and may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving, by a storage controller that includes a cache, a command from a host, wherein a set of criteria corresponding to read response times for executing the command have to be satisfied;
executing a destage application that destages tracks based at least on recency of usage and spatial location of the tracks, wherein a spatial ordering of the tracks is maintained in a data structure, and the destage application traverses the spatial ordering of the tracks; and
destaging tracks from at least inside or outside diameters of disks at periodic intervals, while traversing the spatial ordering of the tracks, wherein the set of criteria corresponding to the read response times for executing the command are satisfied, wherein the method further comprises: setting a timer to a predetermined time interval and setting a destage counter to zero; and picking up a track at a cursor position to destage while traversing the data structure that maintains the spatial ordering of the tracks.

2. The method of claim 1, wherein by destaging tracks from the inside and outside diameters of disks at the periodic intervals, read tracks that are relatively distant from a current location of a head are serviced by overriding the spatial ordering.

3. The method of claim 1, wherein the set of criteria specifies:
average read response time is to be less than a first threshold; and
a predetermined percentage of reads are to be performed in a time less than a second threshold.

4. The method of claim 1, wherein the periodic interval is a fixed predetermined period of time, wherein the fixed predetermined period of time is determined by simulating a workload that corresponds to at least read requests arriving at the storage controller from a stringent read requirements application.

5. The method of claim 1, the method further comprising:
in response to determining that the timer has expired, and in response to determining that the destage counter is zero, performing:
finding the first track at the beginning of the data structure; and
destaging the first track instead of a track at the cursor position, without changing the cursor position.

6. The method of claim 1, wherein the data structure is a sorted binary tree of tracks, the method further comprising:
in response to determining that the timer has expired, and in response to determining that the destage counter is zero, performing:
finding the first track at the beginning of the sorted binary tree;
destaging the first track instead of a track at the cursor position, without changing the cursor position;
incrementing the destage counter to one; and
continuing to pick up tracks to perform destages from the cursor position.

7. The method of claim 6, the method further comprising:
in response to determining that the timer has expired, and in response to determining that the destage counter is not zero, performing:
finding the last track at the end of the sorted binary tree;
destaging the last track instead of a track at the cursor position, without changing the cursor position;
setting the destage counter to zero;
setting the timer to the predetermined time interval; and
continuing to pick up tracks to perform destages from the cursor position.

* * * * *